United States Patent
Parker et al.

(10) Patent No.: US 12,227,299 B1
(45) Date of Patent: Feb. 18, 2025

(54) ELECTRIC VEHICLES WITH DETACHABLY COUPLED PROPULSION UNITS

(71) Applicant: Kitty Hawk Corporation, Palo Alto, CA (US)

(72) Inventors: Madeline Elliott Parker, San Francisco, CA (US); Graham Bowen-Davies, San Jose, CA (US); Robert Donald Vocke, III, San Jose, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 799 days.

(21) Appl. No.: 17/484,233

(22) Filed: Sep. 24, 2021

Related U.S. Application Data

(60) Provisional application No. 63/084,375, filed on Sep. 28, 2020.

(51) Int. Cl.
  *B64D 27/24* (2024.01)
  *B60L 53/80* (2019.01)
  *B64C 29/00* (2006.01)

(52) U.S. Cl.
  CPC .............. *B64D 27/24* (2013.01); *B60L 53/80* (2019.02); *B64C 29/0033* (2013.01); *B60L 2200/10* (2013.01); *B64C 2211/00* (2013.01)

(58) Field of Classification Search
  CPC ..... B64D 27/24; B60L 53/80; B60L 2200/10; B64C 29/0033; B64C 2211/00
  See application file for complete search history.

(56) References Cited

U.S. PATENT DOCUMENTS

| | | | |
|---|---|---|---|
| 2016/0009404 A1* | 1/2016 | Newman | B64D 31/06 701/3 |
| 2018/0222583 A1* | 8/2018 | Parks | B64C 19/00 |

\* cited by examiner

*Primary Examiner* — Brian P Sweeney
(74) *Attorney, Agent, or Firm* — Van Pelt, Yi & James LLP

(57) ABSTRACT

A vehicle that includes a communications interface that exchanges, with a propulsion unit that includes a battery, a first propeller, and a local flight controller, one or more decoupling communications associated with decoupling the propulsion unit and the vehicle and outputs a motor control signal. The vehicle further includes a central flight controller that obtains a reduced thrust allocation map with the first propeller removed and generates, using the reduced thrust allocation map, a motor control signal for a second propeller that is not included in the propulsion unit.

7 Claims, 14 Drawing Sheets

ELECTRIC VEHICLES WITH DETACHABLY COUPLED PROPULSION UNITS

CROSS REFERENCE TO OTHER APPLICATIONS

This application claims priority to U.S. Provisional Patent Application No. 63/084,375 entitled ELECTRIC VEHICLES WITH DETACHABLY COUPLED PROPULSION UNITS filed Sep. 28, 2020 which is incorporated herein by reference for all purposes.

BACKGROUND OF THE INVENTION

New types of electric aircraft that permit passengers to take off and land closer to their starting location and ultimate destination are being developed. One downside of battery-powered vehicles is the amount of time it takes to charge the battery system. New techniques and/or systems which reduce the time to charge a battery system and/or improve the flight range of battery-powered vehicles would be desirable.

BRIEF DESCRIPTION OF THE DRAWINGS

Various embodiments of the invention are disclosed in the following detailed description and the accompanying drawings.

FIG. 7B is a diagram illustrating an embodiment of a vehicle with static and tilting docking points to which propulsion units couple to and detach from.

DETAILED DESCRIPTION

Figure 1A:
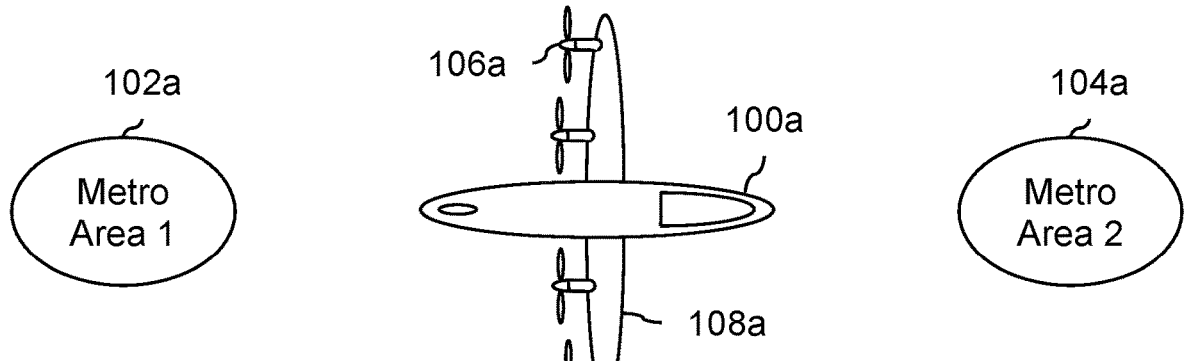
FIG. 1A is a diagram illustrating a top-view embodiment of an electric vehicle with detachably coupled propulsion units.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of an electric vehicle with detachably coupled propulsion units are described herein. Various embodiments of propulsion units are described herein which are capable of flying in at least two modes: independently (e.g., under the control of a local flight controller, either autonomously or remotely piloted) and centrally (e.g., under the control of a central flight controller in (e.g., the airframe of) the vehicle). The propulsion units are capable of detachably coupling to (from) the vehicle, for example, on the trailing edge of a (main) wing or canard. Generally speaking, when a propulsion unit is (detachably) coupled to the vehicle, the propulsion unit is controlled by the central flight controller; when the propulsion unit is decoupled from the vehicle, the propulsion unit is independently controlled by the local flight controller.

The following figure describes one example where detachably coupled propulsion units are used to extend the range of a vehicle in order to fly a relatively long distance (in this example, from one metropolitan area to another).

FIG. 1A is a diagram illustrating a top-view embodiment of an electric vehicle with detachably coupled propulsion units. In this example, the electric vehicle (100a) is flying from a first metropolitan area (102a) to a second metropolitan area (104a). The electric vehicle (100a) in this example is a fixed wing aircraft with four propulsion units (e.g., 106a) that are coupled to the trailing edge of the vehicle's wing (108a). For simplicity and ease of explanation, all of the propulsion units are identical and include (at least) a propeller and a battery.

In this example, the batteries in the propulsion units (e.g., 106a) have sufficient capacity to make at least one flight within the first metropolitan area (102a). However, the distance between the first metropolitan area (102a) and the second metropolitan area (104a) is beyond the power supply of the batteries in the propulsion units. To extend the flight range of the vehicle (e.g., without having to stop and recharge the batteries in the propulsion units), each of the propulsion units (e.g., 106a) is capable of detaching from the vehicle (100a) and being replaced by a fully-charged propulsion unit. The following figures show an example of this.

Figure 1B:
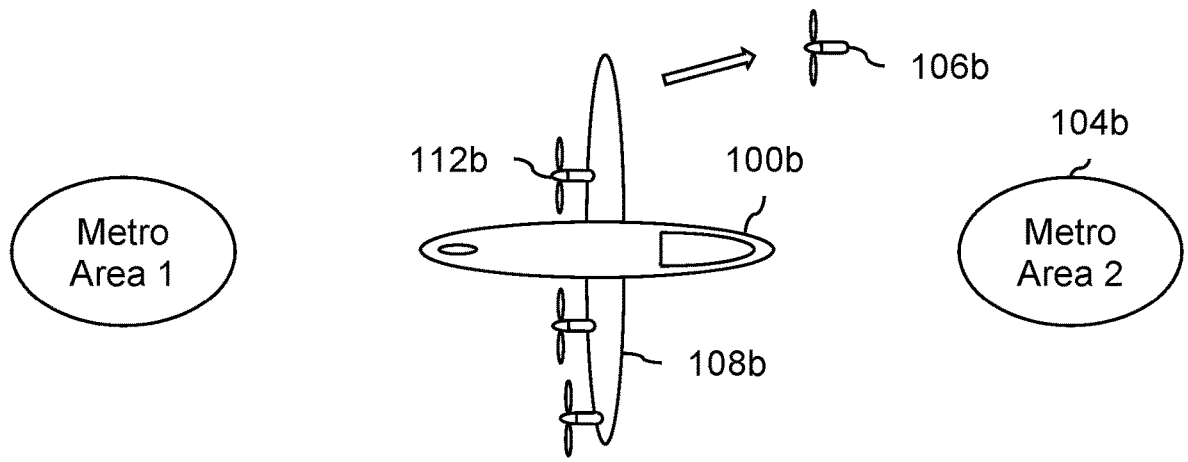
FIG. 1B is a diagram illustrating an embodiment of a low-power propulsion unit decoupling itself from the electric vehicle and flying off.

FIG. 1B is a diagram illustrating an embodiment of a low-power propulsion unit decoupling itself from the electric vehicle and flying off. In this example, the battery in one of the propulsion units (106b) is running low but the vehicle (100b) has not yet arrived at the second metropolitan area (104b). To extend the range of the electric vehicle, the low-power propulsion unit (106b) switches from centralized flight control mode (e.g., where a central flight controller in the vehicle controls the propeller in the propulsion unit) to an independent flight control mode (e.g., where a local flight controller in the propulsion unit controls the propeller in the propulsion unit), detaches itself from the wing (108b) of the vehicle, and flies off.

In some embodiments, the local flight controller has autonomous flight capabilities and autonomously flies the low-power propulsion unit (106b) to a charging station where it automatically lands, automatically docks itself in a charger, and recharges the battery in the propulsion unit.

Figure 1C:
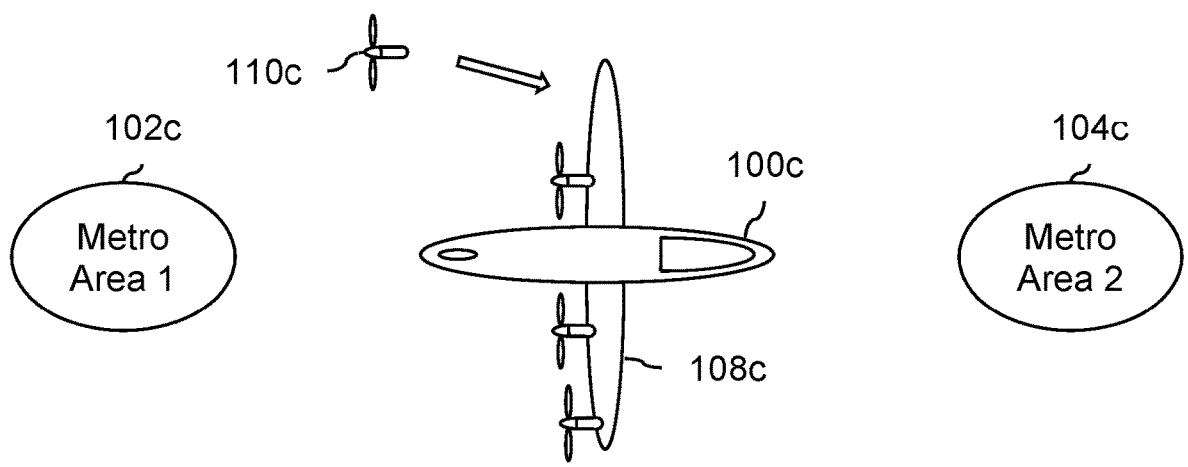
FIG. 1C is a diagram illustrating an embodiment of a fully-charged propulsion unit flying in and detachably coupling itself to the electric vehicle.

FIG. 1C is a diagram illustrating an embodiment of a fully-charged propulsion unit flying in and detachably coupling itself to the electric vehicle. With the low-power propulsion unit (not shown in this figure) removed from the vehicle, a fully-charged propulsion unit (110c) can take its place. For example, in an independent flight control mode (e.g., under the direction of a local flight controller in the propulsion unit), the fully-charged propulsion unit (110c) flies in, detachably couples itself to the wing (108c) at the same location that the low-power propulsion unit previously occupied (at least in this example), and switches over to a centralized flight control mode.

In this manner, low-power propulsion units can be replaced with fully-charged propulsion units, as needed, which permits the range of the vehicle to be extended without having to land and recharge or swap out the batteries. In this example, this permits the vehicle to fly from the first metropolitan area (102c) to the second metropolitan area (104c) even though the distance between them is greater than the range supported by a single battery charge.

In addition to being able to extend the flight range of the vehicle, because the time to charge the battery in the propulsion unit is not a limiting factor, less expensive, lighter, and/or simpler charging components (which correspond to a longer charging time) may be used. This in turn reduces the cost, weight, and design complexity of the propulsion unit as a whole, which is desirable.

It may be helpful to describe an exemplary state machine associated with the replacement example shown in FIGS. 1A-1C to illustrate some embodiments of what the propulsion unit or a central flight controller in the vehicle is doing at various points in time. The following figure shows one example of this.

Figure 2:
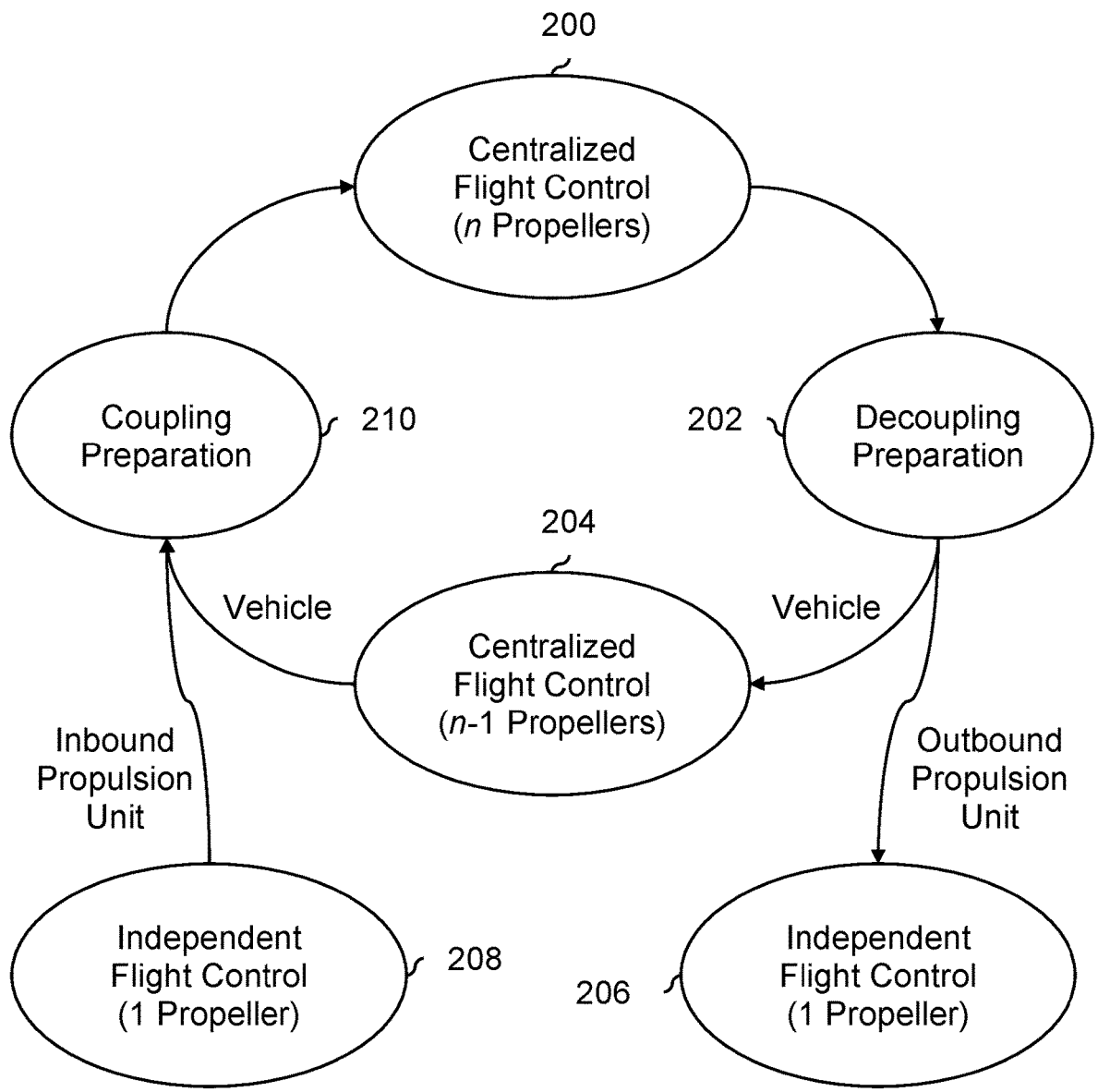
FIG. 2 is a diagram illustrating an embodiment of a state machine associated with an embodiment of a one-for-one replacement of propulsion units.

FIG. 2 is a diagram illustrating an embodiment of a state machine associated with an embodiment of a one-for-one replacement of propulsion units. In this example, a state machine associated with the swapping example shown in FIGS. 1A-1C is shown.

In FIG. 1A, both the low-power propulsion unit (106a) and (a central flight controller in) the vehicle (100a) are in the centralized flight control state (200) where the central flight controller controls all of the propellers, including the propeller in the low-power propulsion unit (106a).

The low-power propulsion unit (e.g., 106a in FIG. 1A) and the central flight controller then transition to the decoupling preparation state (202). In various embodiments, this may be triggered or otherwise initiated by either the central flight controller or the low-power propulsion unit. In one example, the vehicle has reserved a replacement propulsion unit that is located at a charging station or depot between a takeoff location and a landing location. As the vehicle approaches the location of the replacement propulsion unit, the vehicle may initiate the decoupling process so that there is space for the replacement propulsion unit.

In some embodiments, a propulsion unit monitors the charge level in its battery and initiates the decoupling process when its battery level drops below a threshold charge level. For example, if replacement propulsion units are readily available (e.g., because the vehicle stays within a metropolitan area with many replacement propulsion units available) then this may be an acceptable configuration. It may also be desirable in applications where it is desirable to offload processing from the central flight controller.

In some embodiments, the decoupling preparation state (202) includes updating a thrust allocation map in the vehicle and/or used by the central flight controller. For example, the thrust allocation map may reflect the number of propellers (or, more generally, sources of thrust) as well as the location of those propellers. The central flight controller uses this thrust allocation map during thrust allocation to generate motor control signals for the propellers under its control (e.g., based on the desired forces and/or moments) and the thrust allocation map is updated to reflect the imminent departure and/or decoupling of the low-power propulsion unit (106a in FIGS. 1A and 106b in FIG. 1B).

In some embodiments, the decoupling preparation state (202) includes to enable a local flight controller in the propulsion unit. For example, the local flight controller may have been turned off to save power when the propulsion unit was under the control of the central flight controller.

In some embodiments, the decoupling preparation state (202) includes synchronizing the decoupling and takeoff of the propulsion unit. For example, the central flight controller and the propulsion unit may exchange a shared countdown to decoupling and takeoff. This permits, for example, the central flight controller to know when to switch over to the updated thrust allocation map and/or when it can no longer rely upon the outgoing propulsion unit to provide thrust. This may make the transition smoother and/or more aerodynamically stable (e.g., prior to the end of the countdown, the central flight controller increases the amount of thrust output by the remaining propulsion units to avoid a dip in the altitude).

From the decoupling preparation state (202), the vehicle (and/or the central flight controller) transitions to a centralized flight control state (204) but this time with one less propeller. The outbound propulsion unit transitions to an independent flight control state (206) where the local flight controller controls the single propeller in the propulsion unit. As described above, the local flight controller may autonomously fly the propulsion unit to some charging station or depot. These transitions correspond to FIG. 1B.

An inbound propulsion unit (e.g., 110c in FIG. 1C) approaches the vehicle in independent flight control state (208) while the vehicle is in the centralized flight control state and is controlling n−1 propellers (204). The two then transition to the coupling preparation state (210). For example, the vehicle and approaching propulsion unit may communicate via radio communications or use location-based technology to detect when they are close to each other, thus triggering the transition into the coupling preparation state. In some applications, if the propulsion unit is slower than the vehicle, the vehicle slows down during the coupling preparation state (210). In some embodiments, the propulsion unit will maintain at least a minimum distance from the vehicle until the vehicle signals that it may approach the vehicle.

Similar to the decoupling preparation state (202), the coupling preparation state (210) may include synchronizing the time at which the coupling and flight control handover will occur, the updating of the thrust allocation map (e.g., in the vehicle and/or used by the central flight controller), and/or the deactivation of a local flight controller in the propulsion unit.

From the coupling preparation state (210), the vehicle and inbound propulsion unit transition to the centralized flight control state (200) where the central flight controller again has n propellers under its control.

The following figures describe some embodiments of the various processes performed by the vehicle (e.g., a central flight controller in the vehicle), an outgoing propulsion unit (e.g., 106b in FIG. 1B), and an incoming propulsion unit (e.g., 110c in FIG. 1C).

Figure 3A:
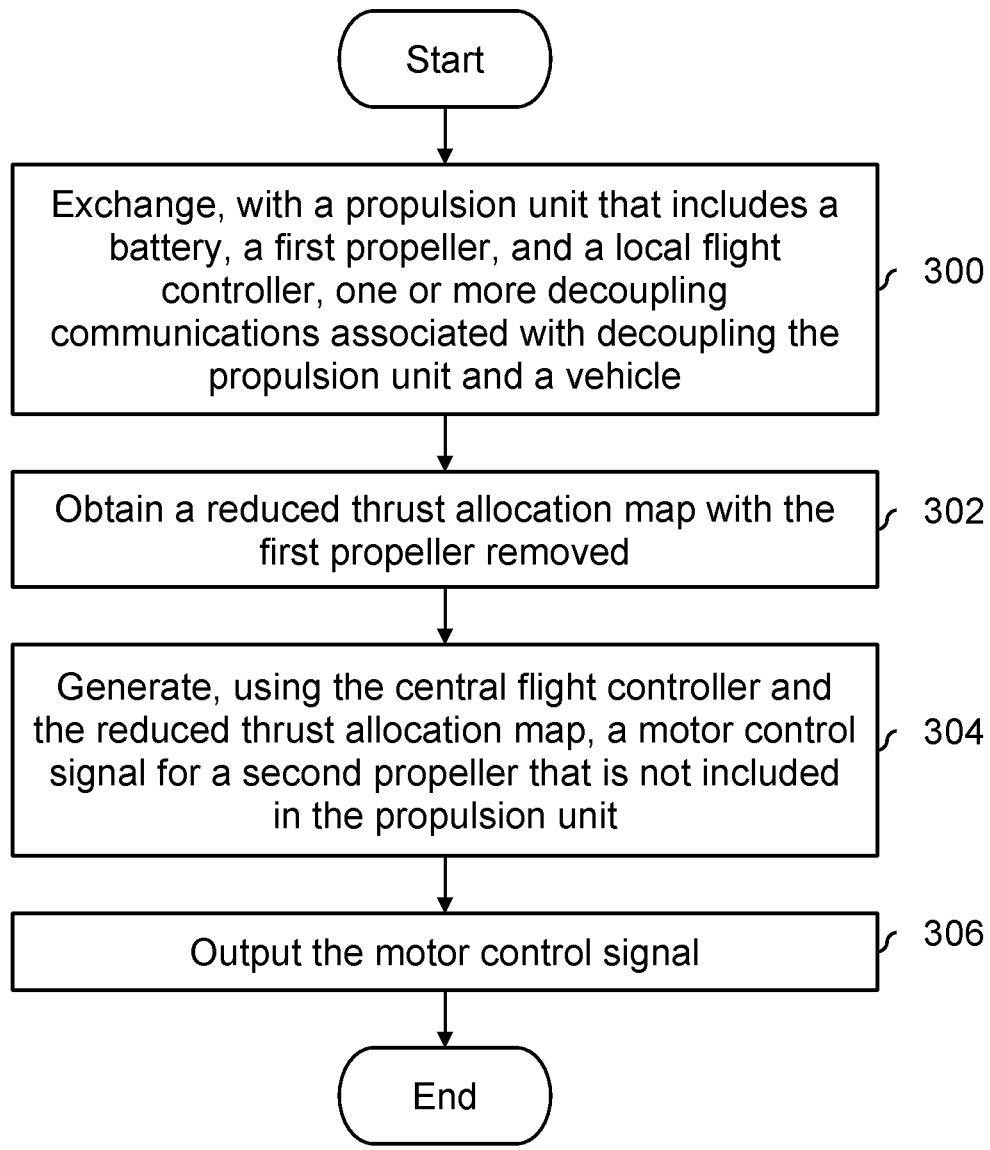
FIG. 3A is a flowchart illustrating an embodiment of a process associated with an outgoing propulsion unit decoupling itself from a vehicle that is performed by the vehicle.

FIG. 3A is a flowchart illustrating an embodiment of a process associated with an outgoing propulsion unit decoupling itself from a vehicle that is performed by the vehicle. For example, the process may be performed by the vehicle (100a) in FIG. 1A as it transitions to the vehicle (100b) shown in FIG. 1B.

At 300, one or more decoupling communications associated with decoupling the propulsion unit and a vehicle are exchanged with a propulsion unit that includes a battery, a first propeller, and a local flight controller.

For example, the decoupling communications may include an initiating communication (from either the propulsion unit or the vehicle) that initiates the decoupling process. In some embodiments, the decoupling communications include a (decoupling) countdown where the propulsion unit decouples from the vehicle and flies off at the end of the countdown. Synchronizing the decoupling may make the transition smoother and/or easier.

In some embodiments, the propulsion unit and the vehicle have no wired connection between them and the decoupling communications are exchanged wirelessly. For example, by avoiding wired connections, this may make the coupling process easier and/or make the (physical) interfaces between the propulsion unit and the vehicle less complex and/or less expensive.

At 302, a reduced thrust allocation map with the first propeller removed is obtained. For example, the reduced thrust allocation map may be obtained by a central flight controller which needs to account for the departure and/or loss of the first propeller to achieve the desired forces and/or moments.

In some embodiments, thrust allocation maps (e.g., reduced or increased) are determined on the fly (e.g., because it is an application where there is some non-negligible variation in the locations where propulsion units can attach themselves). In some embodiments, the thrust allocation maps are predetermined and accessed from memory (e.g., which may be acceptable or desirable in applications where there are prescribed locations where propulsion units can couple with the vehicle and/or the simplicity of predetermined thrust allocation maps is an acceptable tradeoff for any inaccuracy in thrust allocation).

At 304, using the central flight controller and the reduced thrust allocation map, a motor control signal for a second propeller that is not included in the propulsion unit is generated. For example, step 304 is performed by the central flight controller. In FIG. 1B, the propeller in the inboard propulsion unit (112b) in FIG. 1B shows one example of a second propeller that remains coupled (for at least some time after decoupling) and for which a motor control signal is generated.

At 306, the motor control signal is output. In some embodiments, the second propeller is part of another detachable propulsion unit and therefore a relevant motor controller is not on-board. In such embodiments, the motor control signal is output from the vehicle via a (wired or wireless) communications interface module that communicates with the appropriate propulsion unit that includes the second propeller.

Alternatively, if the second propeller is an on-board propeller (e.g., that is permanently attached and/or hard-wired to the vehicle), the motor control signal may be output to the on-board motor controller that controls the second propeller (e.g., without going off-vehicle).

Figure 3B:
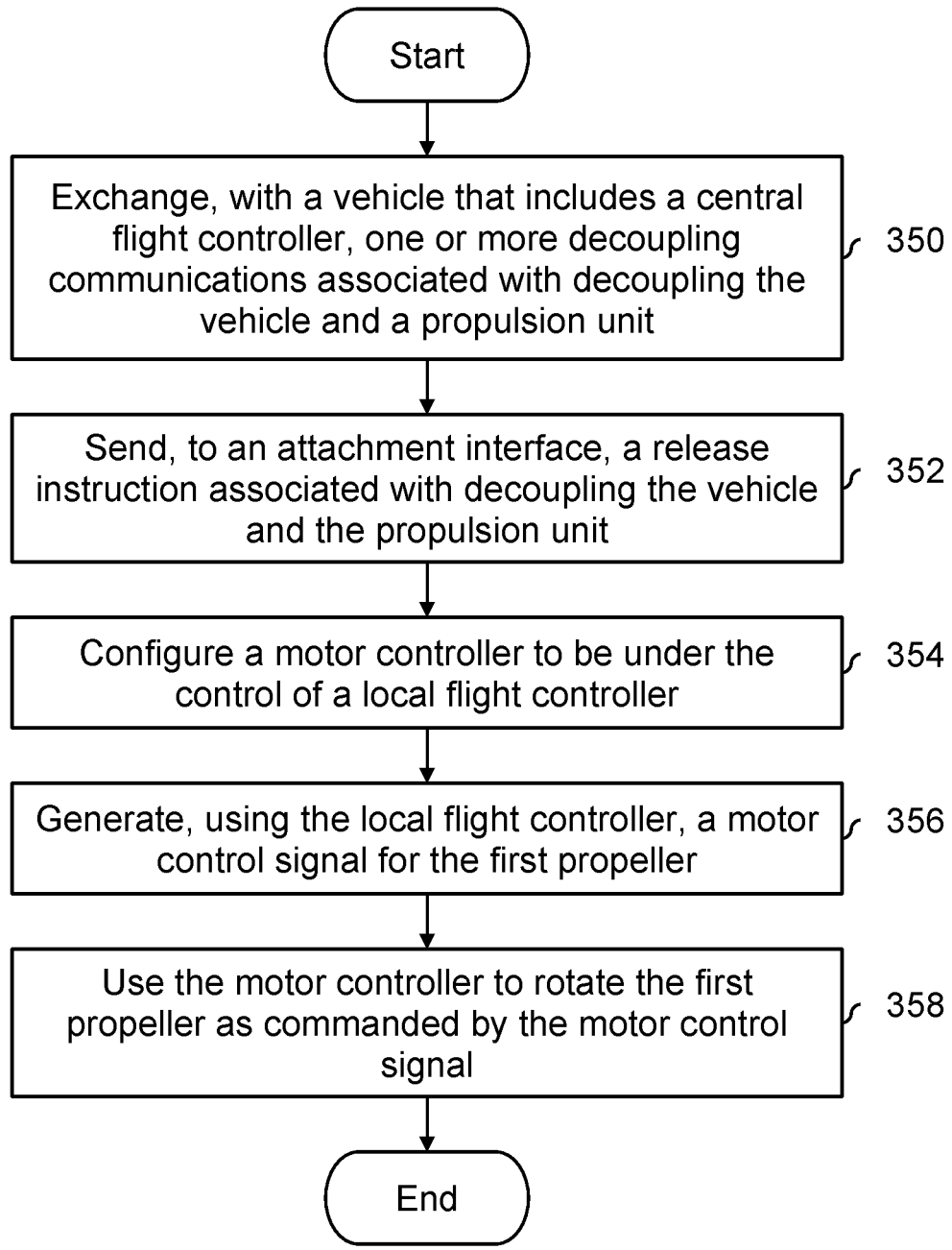
FIG. 3B is a flowchart illustrating an embodiment of a process performed by an outgoing propulsion unit that decouples itself from a vehicle.

FIG. 3B is a flowchart illustrating an embodiment of a process performed by an outgoing propulsion unit that decouples itself from a vehicle. For example, the process may be performed by the propulsion unit (106a) in FIG. 1A as it transitions to the propulsion unit (106b) shown in FIG. 1B.

At 350, one or more decoupling communications associated with decoupling the vehicle and a propulsion unit are exchanged with a vehicle that includes a central flight controller. For example, this may occur via and/or using a communications interface (module) that is configured to communicate with a vehicle via a wired or wireless communication channel.

At 352, a release instruction associated with decoupling the vehicle and the propulsion unit is sent to an attachment interface.

For example, a configuration controller may send the release instruction. A configuration controller may be responsible for changing switches and/or sending instructions associated with switching between an independent flight mode or state (e.g., where a local flight controller on the propulsion unit is in charge of flight when the propulsion unit is decoupled from the vehicle) and a centralized flight mode or state (e.g., where a central flight controller in the vehicle is in charge of flight and the propulsion unit is coupled with the vehicle).

In various embodiments, the attachment interface includes one or more of the following: a clamp, an electromagnet, a latch or locking mechanism, or via cables under tension that interface using hooks and/or eyelets.

At 354, a motor controller is configured to be under the control of a local flight controller. For example, step 354 may be performed by a configuration controller. Previously, the (local) motor controller was controlled by the central flight controller in the vehicle. There may be some multiplexer that controls the input to the motor controller and that multiplexer is switched to select the motor control signals coming from the local flight controller.

At 356, a motor control signal for the first propeller is generated using the local flight controller. For example, the local flight controller performs step 356 and in some embodiments, techniques are used to smooth the switch from the motor control signal generated by the central flight controller to the one generated by the local flight controller. In some embodiments, a low pass filter is used to slowly transition from the motor control signal generated by the central flight controller to the one generated by the local flight controller. In some embodiments, the motor control signal generated by the local flight controller is initially matched to the level of the one generated by the central flight controller. For example, this signal matching may be performed during the countdown.

At 358, the motor controller is used to rotate the first propeller as commanded by the motor control signal.

Figure 4A:
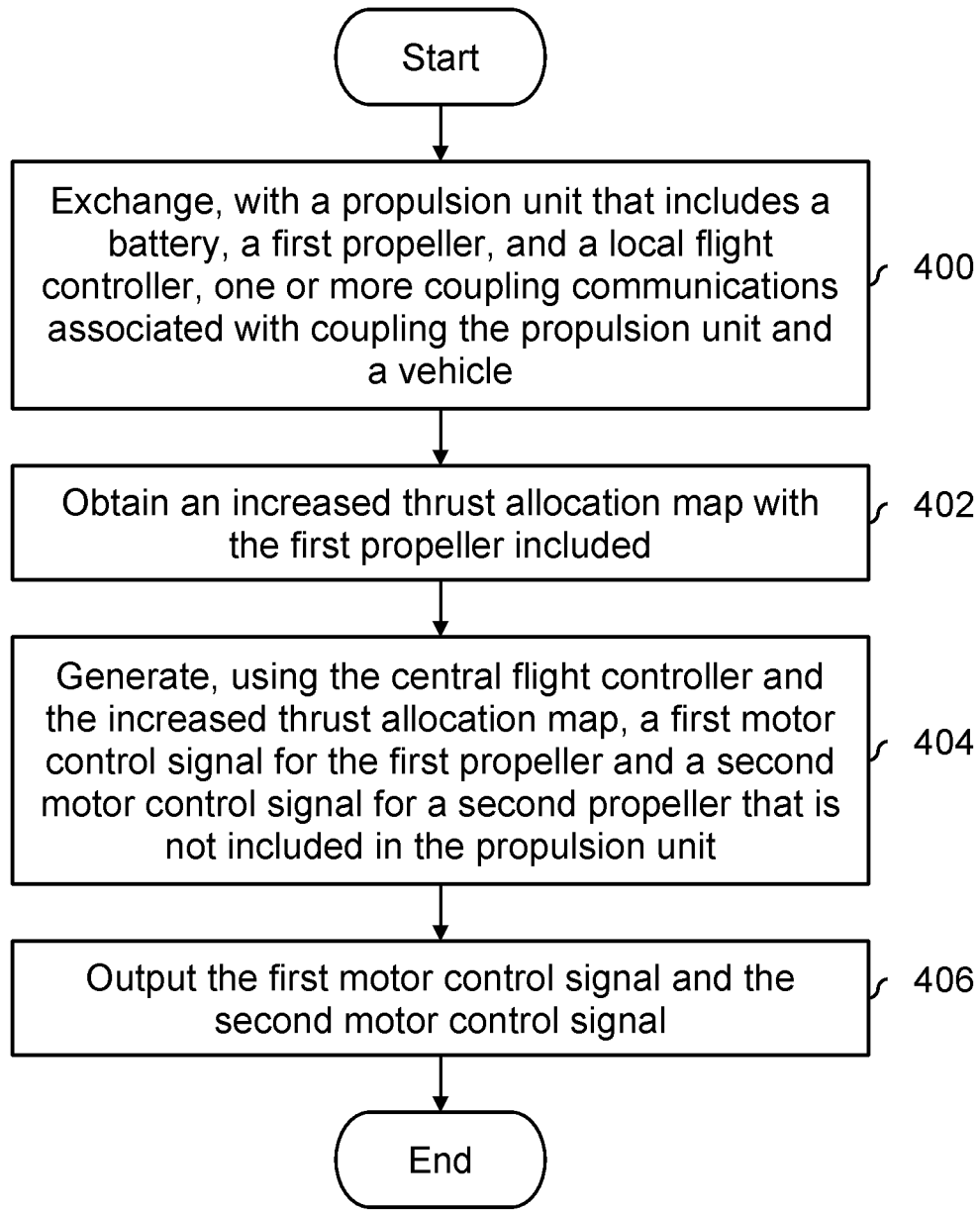
FIG. 4A is a flowchart illustrating an embodiment of a process associated with an incoming propulsion unit detachably coupling itself to a vehicle that is performed by the vehicle.

FIG. 4A is a flowchart illustrating an embodiment of a process associated with an incoming propulsion unit detachably coupling itself to a vehicle that is performed by the vehicle. For example, the process may be performed by the vehicle (100c) in FIG. 1C.

At 400, one or more coupling communications associated with coupling the propulsion unit and a vehicle are exchanged with a propulsion unit that includes a battery, a first propeller, and a local flight controller. As described above, in some embodiments, the incoming propulsion unit keeps its distance from the vehicle until it is granted permission by the vehicle to approach and attach itself and/or couple to the vehicle. The coupling communications may include such a granting of permission to approach and/or couple.

At 402, an increased thrust allocation map with the first propeller included is obtained. For example, with the addition of the incoming propulsion unit, there will be an additional propeller and the thrust from this propeller must be accounted for in the thrust allocation map (e.g., in order to more accurately generate motor control signals that achieve the desired forces and/or moments).

At 404, a first motor control signal for the first propeller and a second motor control signal for a second propeller that is not included in the propulsion unit is generated using the central flight controller and the increased thrust allocation map. As described above, in some embodiments, the second propeller is similarly in another (detachable) propulsion unit that is currently coupled to the vehicle.

At 406, the first motor control signal and the second motor control signal are output. For example, the first motor control signal and/or the second motor control signal may be sent (e.g., wirelessly) via a communications interface module to the appropriate (detachable) propulsion units.

Figure 4B:
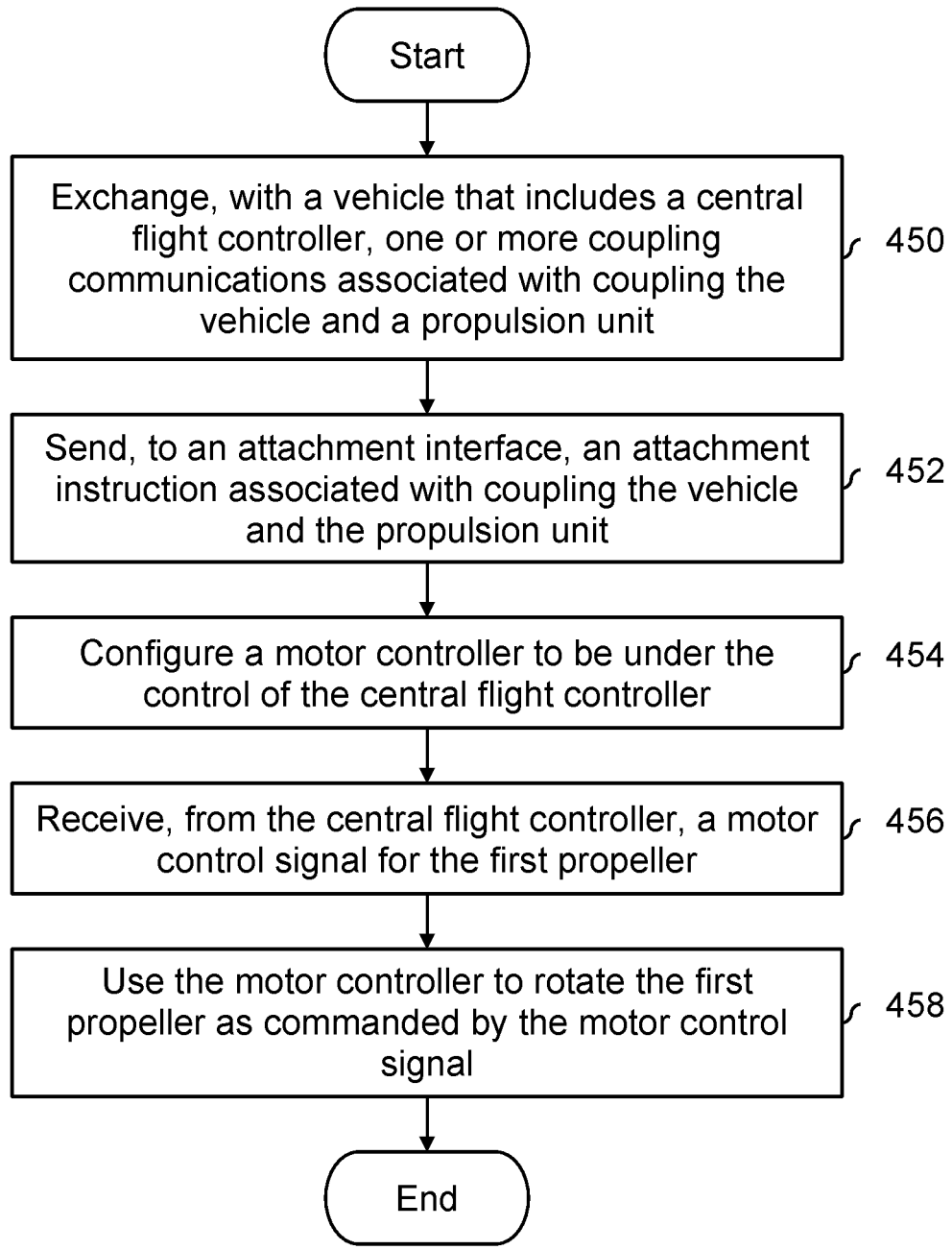
FIG. 4B is a flowchart illustrating an embodiment of a process performed by an incoming propulsion unit that detachably couples itself to a vehicle.

FIG. 4B is a flowchart illustrating an embodiment of a process performed by an incoming propulsion unit that detachably couples itself to a vehicle. For example, the process may be performed by the propulsion unit (110c) in FIG. 1C.

At 450, one or more coupling communications, associated with coupling the vehicle and a propulsion unit that includes a battery, a first propeller, and a motor controller, are exchanged with a vehicle that includes a central flight controller.

At 452, an attachment instruction associated with coupling the vehicle and the propulsion unit is sent to an attachment interface. In one example, the attachment instruction is sent by a configuration controller and causes a clamp-style attachment interface to close down on and/or around the wing of the vehicle.

At 454, a motor controller is configured to be under the control of the central flight controller. For example, there may be a multiplexer that selects the input to the motor controller and the multiplexer is configured (e.g., by a configuration controller) to select the motor control signals that are generated by the central flight controller (e.g., which are communicated via a communications interface module in the propulsion unit).

At 456, a motor control signal for the first propeller is received from the central flight controller. For example, step 456 may be performed by a communications interface on the propulsion unit that exchanges information with the vehicle via a wired or wireless communications channel.

At 458, the motor controller is used to rotate the first propeller as commanded by the motor control signal. In this example, the motor control signal is generated by the central flight controller and so the first propeller is under the control of the central flight controller.

Returning briefly to FIGS. 1A-1C, the following figure shows an example block diagram of a propulsion unit (e.g., 106a, 106b, or 110c in FIGS. 1A-1C).

Figure 5:
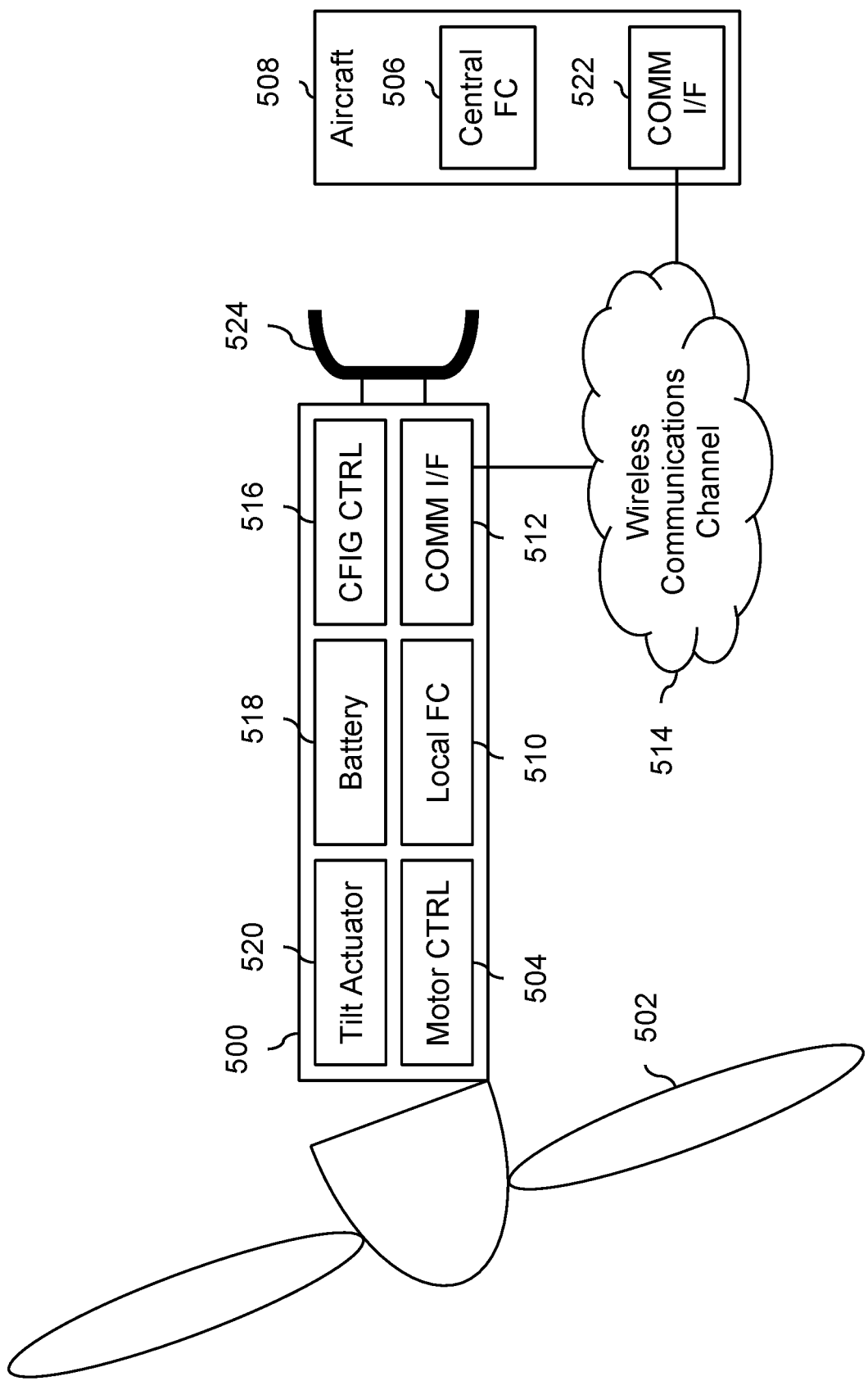
FIG. 5 is a block diagram illustrating an embodiment of a propulsion unit.

FIG. 5 is a block diagram illustrating an embodiment of a propulsion unit. In this example, the propulsion unit (500) is a tiltrotor propulsion unit. The rotation of the propeller (502) is controlled by a motor controller (504). The motor controller (504) rotates the propeller per the motor control signal that is input to the motor controller, which in this example is either generated by the central flight controller (506) in the aircraft (508) or by the local flight controller (510) in the propulsion unit (500).

The communications interface module (512) in the propulsion unit (500) handles communication with a counterpart communications interface module (522) in the aircraft (508) over the wireless communications channel (514). This includes, for example, coupling communications and/or decoupling communications with the aircraft (508), as well as motor control signals from the central flight controller (506), when appropriate.

The configuration controller (516) in the propulsion unit (500) handles the state of the propulsion unit (see, e.g., the state machine shown in FIG. 2) and/or other high level tasks associated with the flight mode. In this example, the configuration controller decides when to disable or power down the local flight controller (e.g., because the motor control signals from the central flight controller (506) are being used). The configuration controller may also decide when to switch a multiplexer in front of the motor controller to select either the motor control signals from the local flight controller (510) or those from the central flight controller (506) which are received via the communications interface module (512).

In this example, the configuration controller also sends attachment and detachment instructions to the attachment interface (524), which in this example is a clamping type of attachment. In this example, an attachment instruction will cause the attachment interface (524) to clamp down (e.g., on the wing of a vehicle) and a release instruction will cause the attachment interface (524) to loosen or otherwise release the clamp.

In some embodiments, the configuration controller (516) monitors the charge level of the battery (518) in the propulsion unit. In some embodiments, if the charge level drops below a threshold, the configuration controller (516) will communicate with the aircraft (e.g., a counterpart configuration controller in the aircraft) to initiate a decoupling of the propulsion unit (500) from the aircraft (508). See, for example, the decoupling preparation state (202) described in FIG. 2.

The tilt actuator (520) controls the position of the tiltrotor propeller (502) (e.g., facing down during a hover or vertical flight mode or facing back for a forward flight or cruising mode). The tiltrotor capability of the propulsion unit (500) permits the vehicle (508) to be an electric vertical takeoff and landings (eVTOL) vehicle. An eVTOL vehicle may be desirable in applications where runways are less readily available and/or takeoff and landing space is at a premium (e.g., in a more densely crowded urban application). In some other embodiments, a propulsion unit is fixed or static (i.e., is not a tiltrotor).

Like the motor controller (504), the tilt actuator (520) may either be under the control of the local flight controller (510) (e.g., when the propulsion unit is decoupled from the aircraft and is flying independently of the vehicle) or under the control of the central flight controller (506) (e.g., when the propulsion unit is coupled to the aircraft). In this example, the configuration controller (516) controls a multiplexer in front of the tilt actuator (520) to select which flight controller has control of the tilt actuator (520).

Although this example shows tilting rotors, in some embodiments, VTOL is supported using some other type of rotors or propellers in a propulsion unit. In some embodiments, a propulsion unit includes (e.g., fixed) lifting (or, alternatively, cruising) rotors that provide only a lifting function for VTOL. For example, propulsion units with such (e.g., fixed) lifting rotors are first used (e.g., during the vertical takeoff) which are then replaced in forward flight by propulsion units that tilt or only provide forward thrust.

In some embodiments, there are multiple types of propulsion units available, each of which has a different set of features and/or capabilities. A system could potentially have a la carte propulsion unit options depending on the flight requirement. For example, some propulsion units may be tiltrotors (e.g., expected to be used during vertical takeoff and landing) whereas other propulsion units are fixed or static rotors (e.g., expected to be used only during forward flight and therefore do not need to tilt).

A vehicle with detachable propulsion units may have a variety of features and/or propulsion units may be used in a variety of ways. The following figures describe some example features and/or applications.

Figure 6:
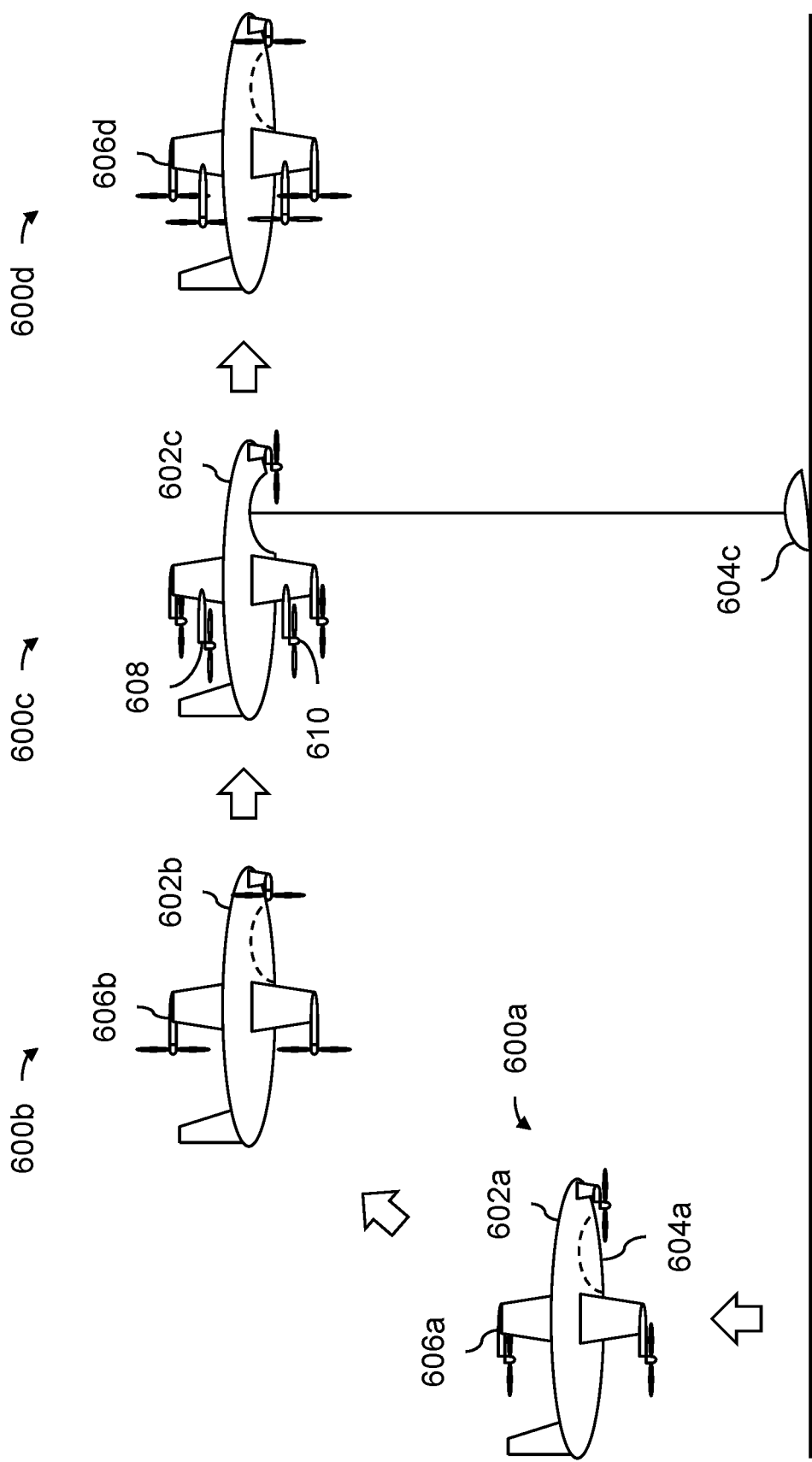
FIG. 6 is a diagram illustrating an embodiment of an eVTOL vehicle with detachable propulsion units and a pod that is attached via a winch.

FIG. 6 is a diagram illustrating an embodiment of an eVTOL vehicle with detachable propulsion units and a pod that is attached via a winch. In the example shown, at a first point in time (600*a*), the vehicle (602*a*) takes off vertically with an empty pod (604*a*) and sufficient propulsion units (606*a*) docked or otherwise coupled to the vehicle for the zero payload portion of the flight to get to a pickup point. In this example, the sufficient number of propulsion units is two on the main wing and two on the canard. It is noted that the tiltrotors are pointing down in this state (i.e., are in a hovering or vertical flight position).

In this example, each propulsion unit (606*a*) is capable of acting as an individual unicopter or drone (i.e., can fly alone and/or independently without control signals from a central flight controller in the vehicle) but is capable of docking with and/or rigidly coupling to the vehicle. When docked and/or coupled to the vehicle, propulsion units are controlled by a central flight controller in the vehicle (e.g., so that the docked propulsion unit operates collectively with the rest of the docked propulsion units to achieve the desired forces and/or moments). Naturally, in some other embodiments, some other configuration or arrangement is used (e.g., a propulsion unit may be a quadcopter).

In this example, the vehicle (602*a*) includes the central avionics (e.g., central flight controller, sensors, etc.) and (e.g., actuated) docking points or interfaces for propulsion units to couple to the vehicle while still allowing for tiltrotor functionality. In this example, the vehicle includes a forward swept main wing and a canard and the overall vehicle is an eVTOL tiltrotor with pusher propellers (i.e., with propulsion units coupled to the trailing edge of the main wing or canard). This airframe is merely exemplary and is not intended to be limiting.

At a second point in time (600*b*), the tiltrotor propulsion units (606*b*) that are coupled to the vehicle (602*b*) transition from a hovering position (mode) to a forward flight position (mode) to fly to the pickup location. Note, for example, the tiltrotor propulsion units (606*b*) in this state are facing backwards instead of downwards. Forward flight is more efficient (e.g., with respect to battery consumption) so the vehicle transitions to forward flight as soon as it can but due to space limitations a vertical takeoff may have been performed.

At a third point in time (600*c*), the vehicle (602*c*) lowers down the pod (604*c*) for passenger and/or cargo pickup and two additional propulsion units (608 and 610) dock or otherwise couple with the vehicle (in this example, with the main wing). In some embodiments, the additional propulsion units (608 and 610) couple to the vehicle (602*c*) before the pod (604*c*) is lowered. It is noted that the shape of the pod (604*a* and 604*c*) is merely exemplary and is not intended to be limiting. Once the pod has been loaded, the vehicle winches the pod back up and begins forward flight to a drop-off destination. See, e.g., the fourth point in time (600*d*) where the tiltrotor propulsion units (606*d*) are in their forward flight position.

For context, lowering the pod, waiting for passengers and/or cargo to enter the pod, and winching up the pod (e.g., in state 600*c*) may take a not-insubstantial amount of time during which the vehicle must hover and hovering is a power-intensive mode of flight. Likewise, performing a vertical ascent once the pod is occupied (e.g., to get to a higher altitude before switching over to forward flight) may consume a relatively large amount of power and/or is thrust intensive. This makes adding more propulsion units (e.g., possibly optimized and/or designed for hovering and/or vertical flight) to the vehicle during this very power and/or thrust-intensive period desirable. In contrast, forward flight may be less thrust and/or power intensive and fewer propulsion units may be needed during that time. In other words, the number of propulsion units coupled to the airframe may be variable depending upon the instantaneous needs of the vehicle at a particular time.

As described above, throughout the flight, propulsion units may swap in and out to meet range requirements (as or if needed). In some embodiments, the propulsion units communicate with each other to coordinate the replacement (e.g., to avoid colliding and/or to minimize the amount of time where the vehicle is down a propulsion unit). In some embodiments, the vehicle is able to fly with a "rotor out" and if one of the propulsion units goes bad, an operational propulsion unit replaces or supplements the bad propulsion unit, eliminating the need to land.

One benefit of this exemplary vehicle configuration is that lowering a pod while the vehicle hovers above reduces the amount of noise observed on the ground during loading and unloading. Another benefit to this exemplary vehicle configuration is that a (rigid) pod that rigidly couples to the airframe reduces the complication of tether dynamics (e.g., compared to a pod that is lifted by multiple multicopters via a "dangly" tether).

As shown in this example, in some embodiment, the propulsion unit includes a tiltrotor such that the vehicle includes a vertical takeoff and landing (VTOL) vehicle and the VTOL vehicle further includes a pod that coupled to a fuselage via a tether and is configured to be in contact with the fuselage during forward flight.

As described above, in some embodiments, a vehicle has docking points which signal to a propulsion unit at that docking point how they should operate and/or be configured. The following figure shows an example of this.

Figure 7A:
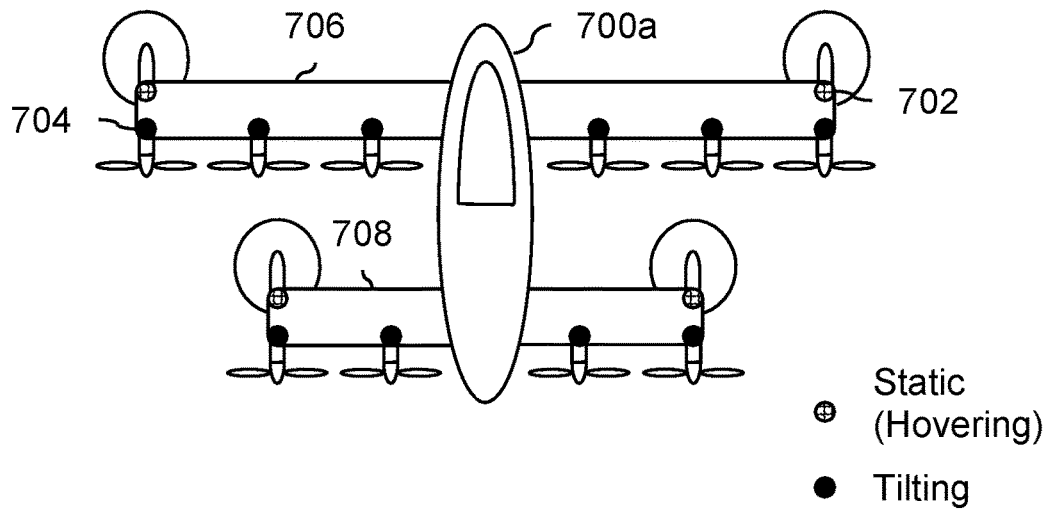
FIG. 7A is a diagram illustrating an embodiment of a vehicle with docking points associated with static propulsion units and tilting propulsion units.

FIG. 7A is a diagram illustrating an embodiment of a vehicle with docking points associated with static propulsion units and tilting propulsion units. In this example, the vehicle (700a) has multiple docking points at which propulsion units are permitted to attach to and/or couple with the vehicle. All of the propulsion units in this example are capable of tilting (i.e., they are tiltable), but only those propulsion units that are coupled to and/or attached at tilting docking points (e.g., 704) are permitted to tilt. The propulsion units that dock at the static docking points (e.g., 702) remain in a static (hovering) position.

In this example there are four static docking points: two on the leading edge of the main wing (706) at the distal ends and two in the same location on the secondary wing (708). In this example there are ten total tiling docking points: six on the trailing edge of the main wing (706) and four on the trailing edge of the secondary wing (708).

In various embodiments, the docking points communicate their particular type (e.g., static versus tilting) via a variety of mechanical and/or electromagnetic interfaces and/or communication techniques. In one example, a vehicle flight controller determines the propulsion types needed based on trip conditions (e.g., distance, payload, speed targets, and/or conditions) and optimizes the locations for best performance or ease of docking (e.g., as conditions dictate). The vehicle flight controller then communicates with the incoming and/or outgoing propulsion units, and maneuvers them to achieve the desired configuration.

In this example there is a single design for the propulsion units. In some applications, this is desirable because it permits the propulsion unit to switch (e.g., if needed in an emergency) from one type of capability to another. Another benefit associated with a fleet of identical propulsion units is that it makes maintenance easier because all of the propulsion units have the same parts and technicians only need to learn one design.

In some other embodiments, there are different designs for the propulsion units that dock at the different docking points. For example, this may reduce the weight and/or cost of the static propulsion units since the tilt actuator and other parts associated with tilting can be removed from static propulsion units since the rotor is in a fixed or static position. In some embodiments with multiple designs, there are differently optimized designs for different phases of flight (e.g., propulsion units with a wing for forward flight vs. propulsion units without a wing for hovering, propulsion units that are aerodynamically shaped for and/or include rotor blades optimized for forward flight vs. hovering, etc.).

The following figure shows an example transition sequence.

Figure 7B:
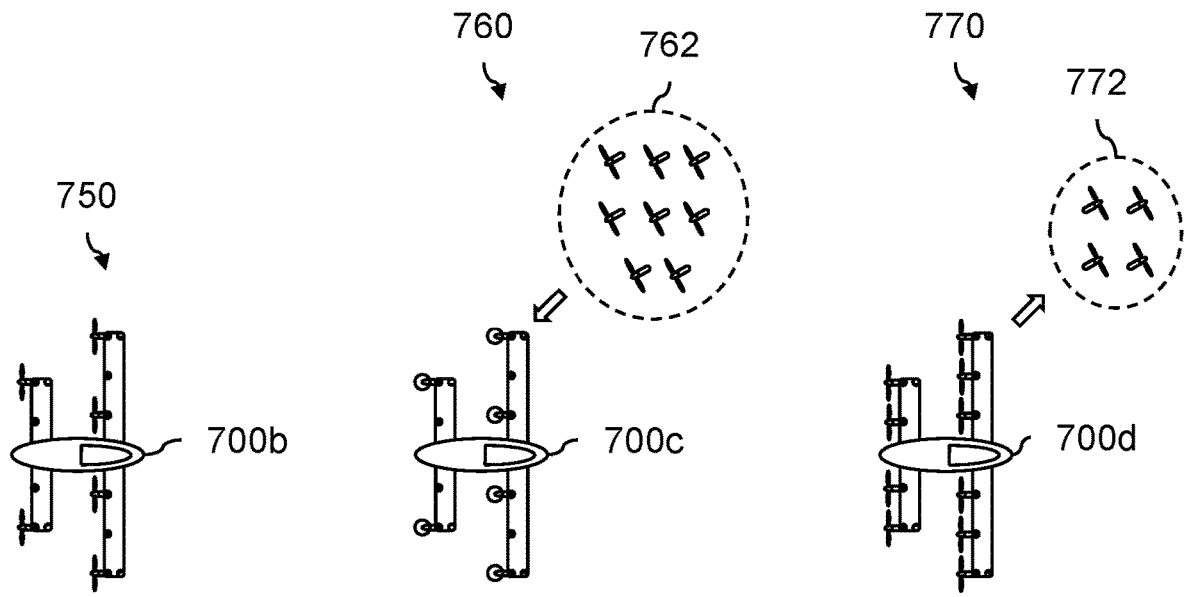

FIG. 7B is a diagram illustrating an embodiment of a vehicle with static and tilting docking points to which propulsion units couple to and detach from. In this example, diagram 750 shows the exemplary vehicle (700b) flying in an empty state with 6 propulsion units attached at tilting docking points where the tiltrotors are in a forward flight position. For example, the vehicle may be flying towards a pickup location where it will pick up passengers and/or cargo. In the state shown here, the vehicle is in a zero-load flight state (e.g., before passengers or cargo is picked up).

Diagram 760 shows the exemplary vehicle (700c) in a passenger loading state. Once the vehicle reaches the pickup location, the six propulsion units tilt their rotors to be in a hovering or vertical flight position as shown here. While in a high altitude hover, eight more propulsion units (762) dock with the airframe at the open docking points. Once the additional propulsion units attach to and/or couple with the vehicle, the vehicle then decreases its (hovering) altitude to a loiter (or winching) height and lowers the pod to the ground for loading.

Diagram 770 shows the exemplary vehicle (700d) loading passengers and/or cargo into the pod and resuming forward flight. With all 14 propulsion units attached and in hover mode (position), the occupied pod is winched up to the vehicle and secured. The vehicle then increases its hover altitude, transitions to forward flight mode (position), and the four propulsion (772) units docked at the static (hovering) docking points depart.

From then on (not shown), fully-charged propulsion units can swap in for low-power propulsion units for range extension as or if needed. For example, with the 10 propulsion units shown in diagram 770, at any time, up to two of the propulsion units can be replaced without consequence (e.g., other than slightly decreased efficiency, which is acceptable). As described above, to extend the range, a replacement propulsion unit (e.g., with fully charged battery) flies in to replace a propulsion unit (e.g., with a mostly-depleted battery). As described above, the ability to swap propulsion units in and out means that the range can be extended indefinitely.

In some embodiments, a tilting propulsion unit has telescoping capabilities (e.g., to accommodate different optimal distances when coupled to a vehicle and centrally controlled verses decoupled from the vehicle and controlled locally and/or independently). The following figure shows an example of this.

Figure 8:
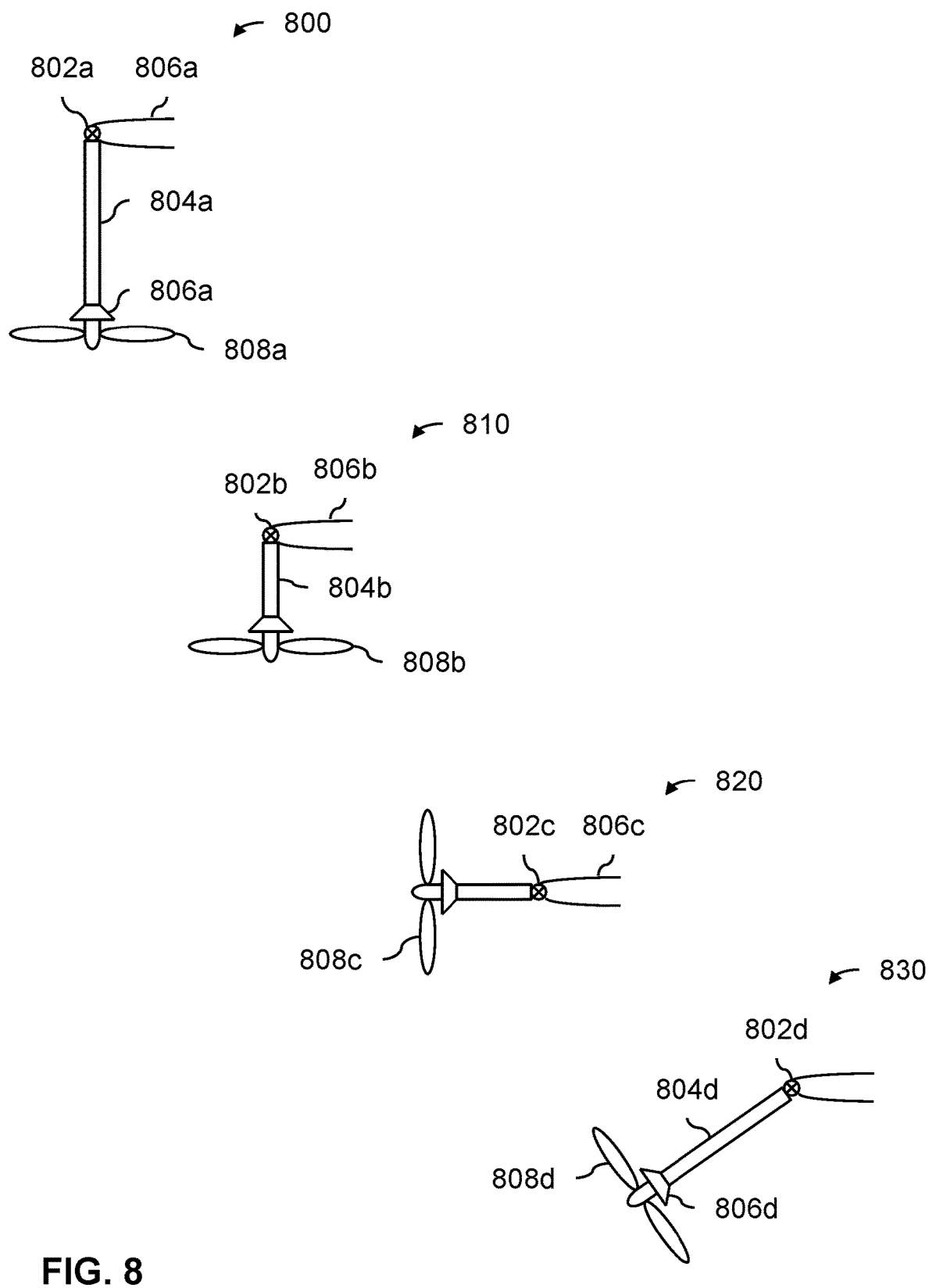
FIG. 8 includes a diagram illustrating an embodiment of an attachment interface in a propulsion unit in various states.

FIG. 8 includes a diagram illustrating an embodiment of an attachment interface in a propulsion unit in various states. In some applications, it is desirable at certain periods during a flight to increase or otherwise adjust the distance between the propulsion units and the vehicle (e.g., when docked and/or coupled versus undocked and/or decoupled). For example, if the propulsion unit couples with the vehicle at a greater distance, this may reduce the likelihood of a collision or blade strike during coupling. In the diagrams shown, side views are shown with a cross section of the wing or canard.

Diagram 800 shows the attachment interface (e.g., an attachment interface) configured for attachment and/or docking. As shown here, the hinge joint with a lock (802a)

permits the telescoping rod (804a) with a guide funnel (806a) at the end to be facing down during docking by the propulsion unit (808a). The view shown is a side view with a wing cross-section (806a) shown; the wing (806a) may be a canard, a main wing, a secondary wing, etc.

The longer distance between the propulsion unit (808a) (or, more specifically, the propellers of the propulsion unit) and the wing (806a) may be desirable when attachment and/or coupling is occurring, but this distance may be undesirable for aerodynamic reasons after attachment has occurred. The following figures show how the distance between the propellers in the propulsion unit (808a) and wing (806a) may be adjusted for (e.g., attached and/or centrally-controlled) forward flight and (e.g., attached and/or centrally-controlled) hovering.

Diagram 810 shows the attachment interface in a hovering position. In this state, the telescoping rod (804b) has retracted (e.g., compared to diagram 800) and the hinge joint (802b) locks the rod at the retracted and/or shortened length. It is noted that the distance between the propellers in the propulsion unit (808b) and wing (806b) has been reduced compared to the distance between those components in diagram 800; for hovering, this reduced distance may be a more optimal distance aerodynamically.

Diagram 820 shows the attachment interface in a forward flight position. The hinge (802c) allows the propulsion unit (808c) to transition from a hovering position to the forward flight position shown here and vice versa. In some embodiments, the distance between the propellers in the propulsion unit (808c) and wing (806c) in this forward flight position is different than the distance in the hovering position (see diagram 810).

Diagram 830 shows the attachment interface when performing a decoupling (e.g., midflight). The hinges (802d) permit the rod (804d) to rotate down to some angle and the rod is extended to allow the propulsion unit (808d) to drop below the plane and/or wake of the vehicle before releasing and/or otherwise detaching itself from the vehicle. A replacement propulsion unit then flies in and docks itself in the open guide funnel (806d).

For simplicity and ease of explanation, the above propulsion unit examples were shown as unicopters. In some embodiments, a propulsion unit includes multiple propellers and/or at least one aerodynamic lift surface (i.e., a wing). The following figures show some embodiments of this.

Figure 9:
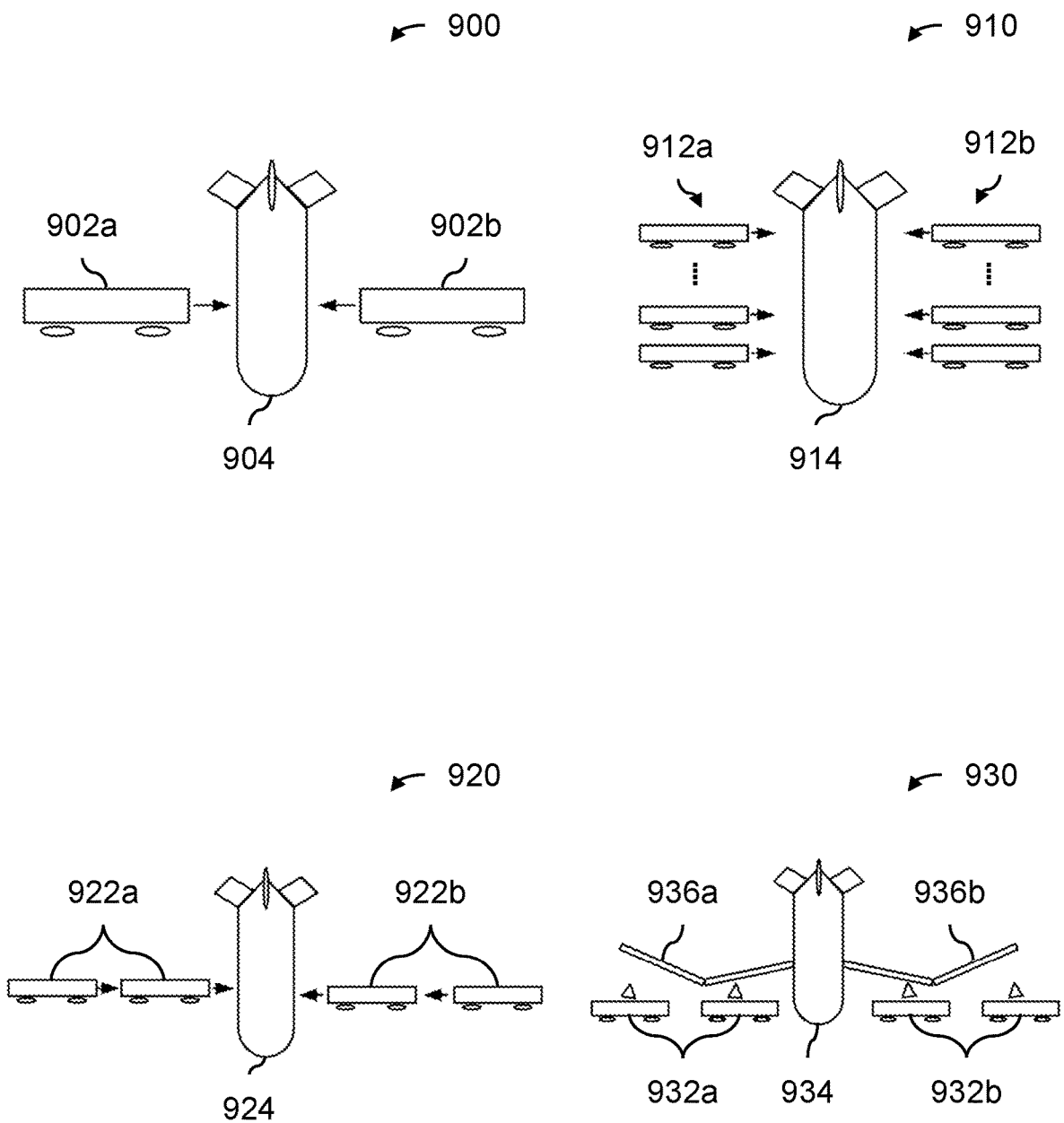
FIG. 9 includes diagrams illustrating various embodiments of propulsion units with a wing.

FIG. 9 includes diagrams illustrating various embodiments of propulsion units with a wing. In the examples shown, the propellers are shown in their forward flight configurations and it is assumed that there is speed parity with multi-rotor (MR) wings providing all lift. Propulsion units that include wings are sometimes referred to herein as multi-rotor (MR) wings. Although these examples show the MR wings coupling to a pod, in some other embodiments a MR wing docks to some other part of the vehicle, (e.g., the airframe, the fuselage, etc.). In some embodiments, hover MRs (e.g., without wings) are used to keep the vehicle airborne at certain times.

Diagram 900 shows an example where two MR wings (902a and 902b) fly in and attach to the pod (904). For example, the exemplary pod (904) may be similar to the pod (604c) shown in FIG. 6 which is lowered to permit passengers and/or cargo to board a vehicle. One or more hover MRs (not shown) may be (re-)attached to the pod to switch out the (MR) wings.

Diagram 910 shows a parallel airplane example where three or more MR wings (912a and 912b) fly in per side and attach to the pod (914). This configuration may be desirable in some applications because it potentially allows for smaller MR wings and MR wings could potentially be swapped out without the use of hover MRs (e.g., so fewer types of propulsion units need to be supported or otherwise maintained).

Diagram 920 shows a serial airplane example where four or more MR wings (922a and 922b) fly in and attach to the pod (924), wing to wing tip. In some applications, this configuration is more efficient due to: 1) longer wingspan results in larger aspect ratio, which can improve efficiency (e.g., reducing induced drag losses) and/or 2) by reducing interference (e.g., front-to-back) between propulsion units, wings, and pod, each can operate at higher efficiency (e.g., cleaner air).

As shown in this example, in some embodiments, a distal end of a (first) wing is configured to detachably and serially couple to a distal end of a second wing included in a second propulsion unit system.

Diagram 930 shows a serial airplane with a skeleton example where four or more MR wings (932a and 932b) fly in and attach to a wing spar skeleton (936a and 936b) which is attached to the fuselage (934). As the name implies, a wing spar skeleton is a spar which provides a framework (i.e., skeleton) to which the MR wings attach. In some embodiments, the skeleton is foldable and/or retractable. This configuration allows for arbitrary and/or more flexible swapping of winged MRs. For example, if more MR wings are desired, then the skeleton can be unfolded and/or extended to expose a longer length. In some embodiments, the position and/or angle of the skeleton is adjustable so that the MR wings can be attached at a variety of positions (e.g., relative to each other, relative to a center of mass, and/or to change the produced center of lift or thrust, etc.).

Although the examples described above show MR wings coupling to a pod, in some embodiments, an MR wing (or, more generally, a propulsion unit) couples and/or attaches to some other part of the vehicle (e.g., the fuselage, a pylon, a trapping nacelle, etc.).

Figure 10:
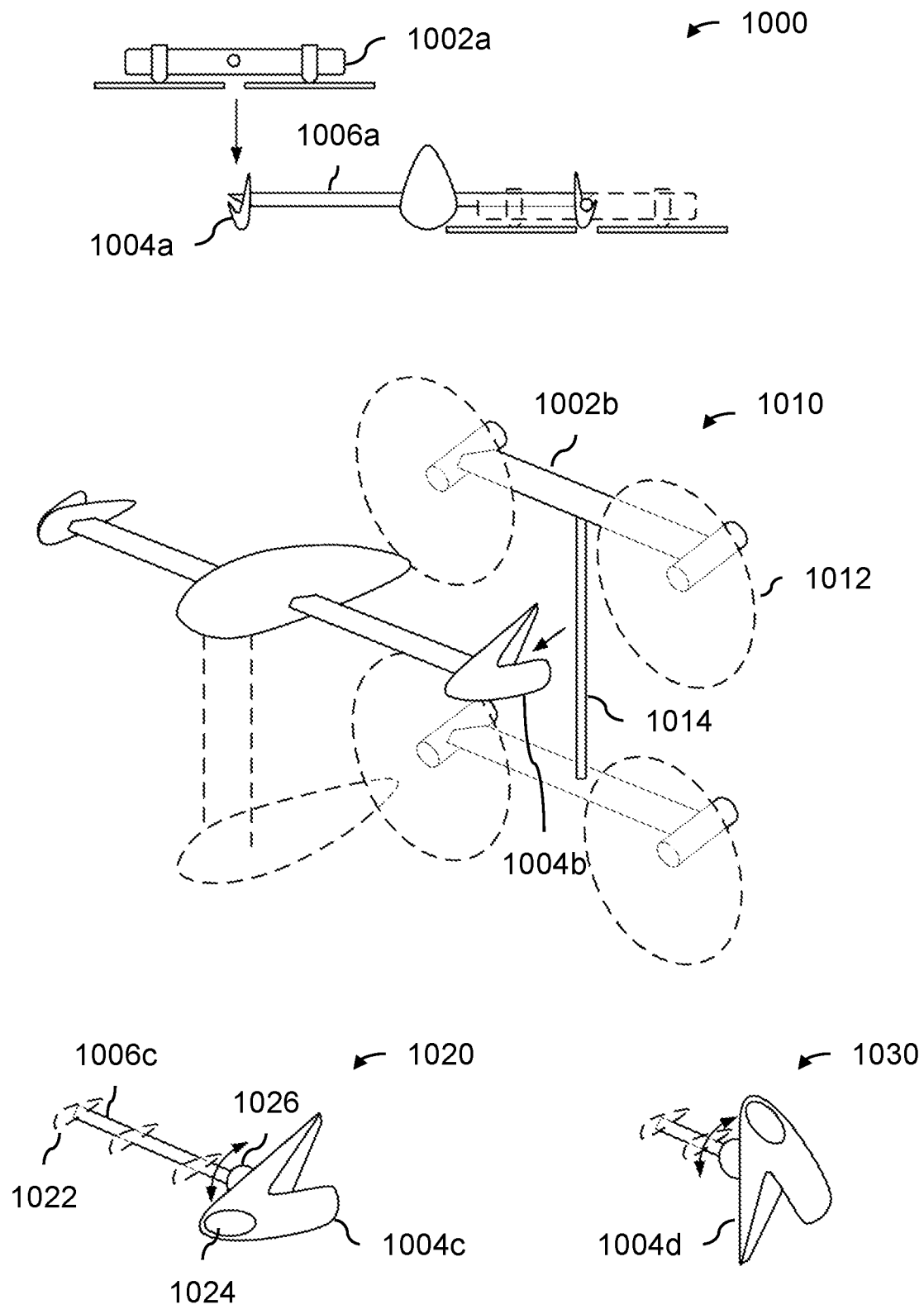
FIG. 10 includes diagrams showing an embodiment of a (detachable) propulsion unit with multiple propellers.

FIG. 10 includes diagrams showing an embodiment of a (detachable) propulsion unit with multiple propellers. The embodiment shown here is merely exemplary and any appropriate mechanisms to latch or tilt the propulsion unit may be used.

In this example, diagram 1000 shows a top view of a propulsion unit (1002a) docking to a V-shaped interface (1004a) at the distal ends of a boom (1006a). In some embodiments, the V-shaped interface is at the distal end of a wing.

Diagram 1010 shows a perspective view of the vehicle and the propulsion unit. As shown here, the exemplary propulsion unit (1002b) includes four rotors or propellers (e.g., 1012) where a vertical spar or connector (1014) is inserted into the V-shaped latching mechanism (1004b). Other rotors or propellers (not shown) may keep the vehicle airborne and/or hovering while a propulsion unit docks (e.g., in a forward flight mode or position) as shown here.

Diagrams 1020 and 1030 show the exemplary latching and tilting mechanisms in more detail. In diagram 1020, the boom (1006c) has (minimal) fairing (1022) to reduce drag. In some embodiments, the fairing is floating on a spar. Diagram 1020 also shows a leading-edge weight (1024) on the V-shaped interface (1004c) to ensure passive cruise orientation. In some embodiments, the V-shaped interface includes a spring (not shown) to do this (e.g., in addition to or as an alternative to a weight). Located between the boom (1006c) and the V-shaped interface (1004c) is a passive pitch bearing (1026) which allows the thrusters to tilt relative to the body using differential thrust instead of a separate actuator.

Diagram 1030 shows the V-shaped interface (1004*d*) in a hovering orientation or position. In some embodiments, the V-shaped interface (1004*d*) has a latching mechanism. In one example, the mechanism is a sprung latch or lock (e.g., similar to a car door latch) where the vertical spar of the propulsion unit can engage the latch by applying pressure (e.g., flying into the latch) and the latch itself is passively engaged. The latch is then locked and requires an actuator to release the latch to allow the propulsion unit to decouple and/or depart from the vehicle.

As described above, in some embodiments, there is a reservation system via which propulsion units along a flight path can be reserved. The following figures show an example of this.

Figure 11A:
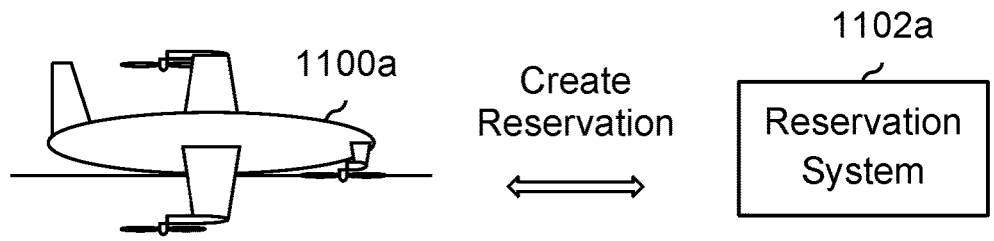
FIG. 11A is a diagram illustrating an embodiment of a reservation that is made with a reservation system before takeoff.

FIG. 11A is a diagram illustrating an embodiment of a reservation that is made with a reservation system before takeoff. In this example, a vehicle (1100*a*) is planning a flight for which it would like a propulsion unit. To that end, the vehicle communicates with a reservation system (1102*a*) to reserve a propulsion unit if available. For example, a desired propulsion unit may be to replace a low-battery propulsion unit during a long flight, or to supplement existing propulsion units during a power-intensive portion of the planned flight (e.g., the vehicle will hover in air for a relatively long time during part of the planned flight).

In some embodiments, the vehicle (1100*a*) sends a flight plan to the reservation system (1102*a*) with current charge levels for batteries in the propulsion units that are currently attached to the vehicle. The reservation system may then determine a time window (e.g., when the propulsion units would be needed) and location window (e.g., where the propulsion units would be needed) and determine if there are any available propulsion units (e.g., given the location of charging depots and what available propulsion units there are at appropriate and/or nearby charging depots).

In some embodiments, the reservation system (1102*a*) makes or otherwise tracks reservations according to a unique flight number as opposed to an identifier that is tied to a vehicle. For example, this may permit reservations to be made for the same vehicle but for different flight plans (e.g., a flight planned for today versus a flight planned for tomorrow). In some embodiments, reservations are made or otherwise tracked using an identifier that is tied to a user. For example, this may be helpful in applications where users are only permitted to have a certain number of propulsion units reserved.

In some embodiments, before a vehicle is permitted to take off, a check is performed if a replacement or supplemental propulsion unit is needed for the planned flight. If so, a second check is performed to ensure that reservation(s) have been made for those replacement or supplemental propulsion units. If not, the vehicle may not be permitted to take off (e.g., in a fleet of autonomous vehicles).

Returning briefly to the pod example of FIG. 6, in some embodiments, before the pod is lowered, a check is performed to ensure that sufficient propulsion unit resources have been reserved. For example, the vehicle may access or otherwise communicate with a reservation system and inquire about associated reservations that are associated with the user or a unique flight identifier.

Figure 11B:
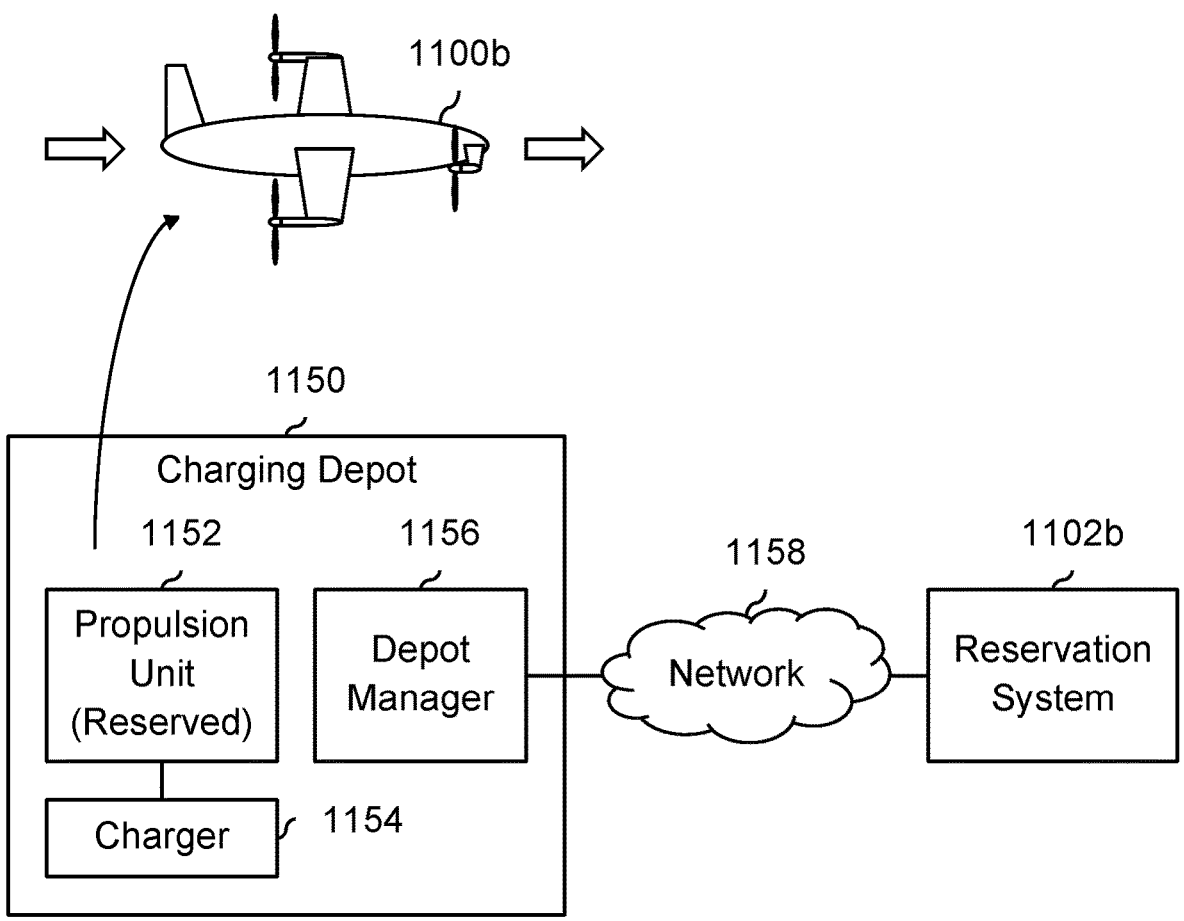
FIG. 11B is a diagram illustrating an embodiment of a reserved propulsion unit that couples with a vehicle mid-flight.

FIG. 11B is a diagram illustrating an embodiment of a reserved propulsion unit that couples with a vehicle mid-flight. For simplicity and ease of explanation, in this example, the charging depot (1150) includes a single propulsion unit (1152) and a single charger (1154) that charges the battery in that propulsion unit. In other embodiments, a charging depot has multiple chargers and/or propulsion units. Likewise, there may be multiple charging depots scattered through an area.

The depot manager (1156) and reservation system (1102*b*) communicate over a network (1158) so that new reservations can be communicated to the depot manager. In some embodiments, a push update mechanism is used which conserves communication bandwidth while keeping the reservation information at the depot manager up to date. This permits the depot manager to know (for example) that vehicle (1100*b*) (or an associated user or associated flight plan) has reserved the propulsion unit (1152).

In this example, the depot manager (1156) manages communication with the vehicle and controls whether a propulsion unit is released to a vehicle. As such, as the vehicle (1100*b*) flies along its flight plan and approaches the depot manager (1156), the vehicle communicates with the depot manager (1156) to request and/or release the reserved propulsion unit (1152). This may include, for example, providing the depot manager with a unique flight (plan) identifier or an identifier associated with a user.

Once the propulsion unit is permitted to join the vehicle by the depot manager and flies off, the depot manager (1156) communicates this information (at least in this example) to the reservation system (e.g., sends a pickup confirmation to the reservation system). In some cases, the vehicle may not need the reserved propulsion unit (e.g., because the user decides not to take the flight) and does not pick up the reserved propulsion unit (1152). The reservation system (1102*b*) and depot manager (1156) may communicate to determine if or when this scenario has occurred. For example, if the reservation system does not receive a pickup confirmation from the depot manager (1156) after a certain amount of time after the expected pickup time, the reservation system may assume the reservation is no longer needed, will update its reservation records to note that the previously-reserved propulsion unit (1152) is not available, and communicate that information to the depot manager (1156) as appropriate.

In some embodiments, the depot manager (1156) manages the local and/or lower-level allocation of the propulsion units that are at that particular charging depot. For example, the depot manager may know better than the reservation system which propulsion units at that charging depot are fully charged and ready to go. In some embodiments, the depot manager selects one of the available fully charged propulsion units and releases it as the reserved propulsion unit (1152) to the vehicle (1100*b*).

In some embodiments, there are different types of propulsion units with different capabilities and/or features. For example, some propulsion units may have larger battery capacities than other propulsion units. Or, some propulsion units may be tiltrotor propulsion units whereas others are static-configuration propulsion units that can only fly in a hovering mode or forward flight mode. The reservation system may pass along desired propulsion unit characteristic(s) and the depot manager may select one that meets the desired characteristic(s).

The following figure describes a reservation service more generally and/or formally in a flowchart.

Figure 12:
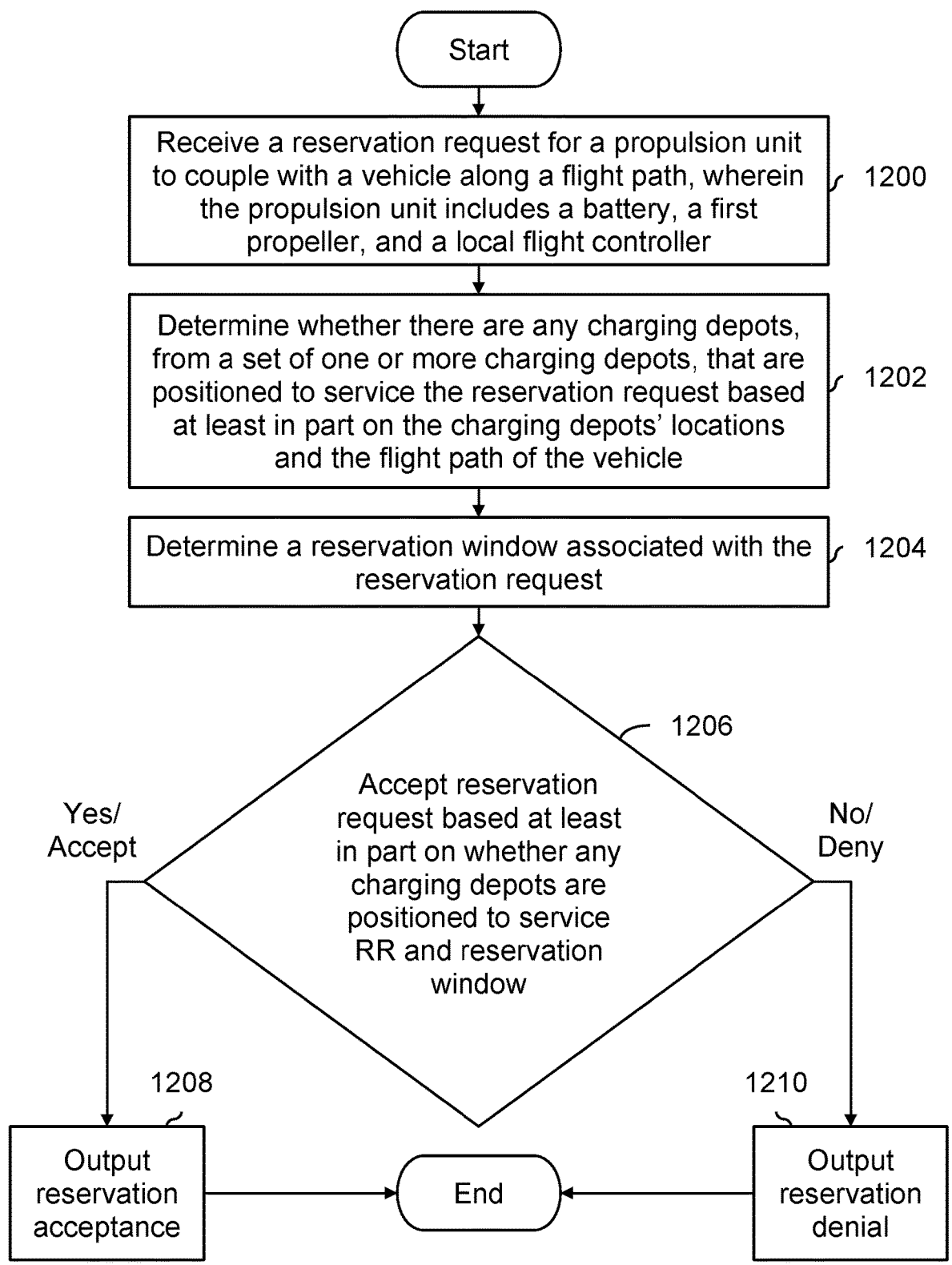
FIG. 12 is a flowchart illustrating an embodiment of a process associated with providing a reservation service.

FIG. 12 is a flowchart illustrating an embodiment of a process associated with providing a reservation service. In one example, the exemplary process is performed by the reservation system (1102*a* and 1102*b*) in FIGS. 11A and 11B.

At 1200, a reservation request for a propulsion unit to couple with a vehicle along a flight path is received, wherein the propulsion unit includes a battery, a first propeller, and a local flight controller. For example, on-the-ground vehicle (1100a) in FIG. 11A may send a reservation request to the reservation system (1102a) prior to takeoff.

At 1202, it is determined whether there are any charging depots, from a set of one or more charging depots, that are positioned to service the reservation request based at least in part on the charging depots' locations and the flight path of the vehicle.

In one example of step 1202, the reservation request received at step 1200 includes a flight plan and current charge levels of the batteries in the propulsion units that are currently coupled to the vehicle (e.g., the vehicle may pull or otherwise request this information from its attached propulsion units prior to sending the reservation request). In this example, the decision making about where and/or when a requested propulsion unit should couple to a vehicle is performed at the reservation system (1102a). For example, the reservation system (1102a) may have more abundant power and/or processing resources than a vehicle, and if changes to the reservation decision making are needed, keeping this decision making in a centralized location makes it easier to update (e.g., instead of having to disseminate new reservation decision making to each of the vehicles). The reservation system may use the flight path information and the locations of the charging depots to decide if there are any charging depots that are in a position (e.g., along the flight path, or close enough to the flight path where a propulsion unit can fly out and intercept the vehicle) that can provide a propulsion unit.

At 1204, a reservation window associated with the reservation request is determined. For example, the reservation window may be an expected window of time during which the requested propulsion unit would be dedicated to and/or coupled to the vehicle (e.g., including transit time to or from a charging depot). A given propulsion unit cannot service a reservation request unless it is available for the entire duration of the reservation window. In some embodiments, a flight plan included in the reservation request includes timing information (e.g., a planned departure time and a planned arrival time) and this flight plan timing information is used to determine the reservation window.

At 1206, it is determined whether to accept the reservation request based at least in part on whether there are any charging depots that are positioned to service the reservation request (e.g., at step 1202) and the reservation window. For example, the charging depots that are positioned to be able to service the reservation request are checked for propulsion units that are available during the reservation window. If multiple charging depots with at least one available propulsion unit are found, then some selection technique may be used (e.g., the charging depot with the most available propulsion units, the charging depot with the lowest average utilization rate (i.e., least popular), the closest charging depot to the flight path and/or an optimal interception location, etc.).

If it is determined (at step 1206) to accept the reservation request, a reservation acceptance is output at 1208. For example, reservation system (1102a) in FIG. 11A may send a reservation acceptance to the on-the-ground vehicle (1100a). Otherwise, a reservation denial is output at 1210.

In some embodiments, in the event it is determined to accept the reservation request, the reservation system is further configured to push reservation information associated with a new reservation to a depot manager associated with a charging depot that will provide a reserved propulsion unit. As described above, by pushing new reservations and/or reservation updates to the depot managers (e.g., 1156 in FIG. 11B) may conserve power and/or communication bandwidth (e.g., over network 1158 in FIG. 11B).

As described above, in some embodiments, the reservation system is further configured to: in response to a request that includes an identifier and is associated with an impending takeoff, provide any reservation information associated with the identifier, wherein the provided reservation information is used to determine if the impending takeoff is permitted to occur based at least in part on whether the impending takeoff has a sufficient number of propulsion units reserved.

For example, before on-the-ground vehicle (1100a) in FIG. 11A is permitted to take off, a ground controller (not shown) may check to ensure that the vehicle has a sufficient number of propulsion units reserved (e.g., given the planned flight path and/or the charge levels of the batteries in the currently-attached propulsion units).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A propulsion unit system, comprising:
   a battery;
   a communications interface that is configured to exchange, with a vehicle that includes a central flight controller, one or more decoupling communications associated with decoupling the vehicle and the propulsion unit system;
   a configuration controller that is configured to:
      send, to an attachment interface, a release instruction associated with decoupling the vehicle and the propulsion unit system; and
      configure a motor controller to be under the control of a local flight controller;
   the local flight controller that is configured to generate a motor control signal for a first propeller; and
   the motor controller that is configured to rotate the first propeller as commanded by the motor control signal.

2. The propulsion unit system recited in claim 1, wherein the communications interface is configured to exchange the one or more decoupling communications over a wireless communications channel.

3. The propulsion unit system recited in claim 1, wherein the propulsion unit system further includes a tiltrotor such that the vehicle includes a vertical takeoff and landing (VTOL) vehicle.

4. The propulsion unit system recited in claim 1, wherein:
   the vehicle further includes a docking point that communicates configuration information to the propulsion unit system; and
   the propulsion unit system configures itself as specified by the configuration information.

5. The propulsion unit system recited in claim 1 further including a plurality of propellers.

6. The propulsion unit system recited in claim 1 further including a wing.

7. The propulsion unit system recited in claim 1 further including a wing, wherein a distal end of the wing is configured to detachably and serially couple to a distal end of a second wing included in a second propulsion unit system.

* * * * *